United States Patent
Tamura et al.

(10) Patent No.: US 10,920,884 B2
(45) Date of Patent: Feb. 16, 2021

(54) IN-WHEEL MOTOR DRIVE DEVICE

(71) Applicant: NTN CORPORATION, Osaka (JP)

(72) Inventors: Shiro Tamura, Shizuoka (JP); Yusuke Shibuya, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/339,385

(22) PCT Filed: Nov. 4, 2016

(86) PCT No.: PCT/JP2016/082801
§ 371 (c)(1),
(2) Date: Apr. 4, 2019

(87) PCT Pub. No.: WO2018/070056
PCT Pub. Date: Apr. 19, 2018

(65) Prior Publication Data
US 2020/0040992 A1   Feb. 6, 2020

(30) Foreign Application Priority Data

Oct. 14, 2016 (JP) .................................. 2016-202639

(51) Int. Cl.
*F16H 63/34* (2006.01)
*B60B 27/00* (2006.01)
(Continued)

(52) U.S. Cl.
CPC ..... *F16H 63/3425* (2013.01); *B60B 27/0021* (2013.01); *B60K 7/0007* (2013.01);
(Continued)

(58) Field of Classification Search
CPC .................. B60K 7/00; B60K 7/0007; B60K 2007/0046; B60K 2007/0061;
(Continued)

(56) References Cited

U.S. PATENT DOCUMENTS

| 5,419,406 A | 5/1995 | Kawamoto et al. |
| 5,429,212 A | 7/1995 | Schlosser |

(Continued)

FOREIGN PATENT DOCUMENTS

| DE | 195 33 141 | 2/1997 |
| DE | 198 31 069 | 1/2000 |

(Continued)

OTHER PUBLICATIONS

English language machine translation of the description of DE 19533141. 5 pages. [online] Retrieved from ESPACENET (www.epo.org) on May 25, 2020. (Year: 2020).*

*Primary Examiner* — Richard M Lorence
(74) *Attorney, Agent, or Firm* — Clark & Brody LP

(57) ABSTRACT

In an in-wheel motor drive device, a speed reduction part is a parallel shaft gear reducer that includes a plurality of gear shafts extending in parallel to one another. One of the gear shafts is coupled with the rotation shaft of the motor part, the other one of the gear shafts is coupled with the wheel hub of the wheel hub bearing part. Remaining gear shafts decelerate the rotation of the motor part and transmit it to the wheel hub. The motor drive device includes a parking gear attached to any of the gear shafts. The parking pawl has a projection portion engaged with a recess portion of the parking gear. A movement member enables a parking pawl to move between a locking position engaged with the recess portion and an unlocking position not engaged therewith. The parking gear, the parking pawl, and movement member are housed inside a housing.

4 Claims, 3 Drawing Sheets

(51) Int. Cl.
 *B60K 7/00* (2006.01)
 *B60K 17/04* (2006.01)
(52) U.S. Cl.
 CPC ....... *B60K 17/043* (2013.01); *F16H 63/3433* (2013.01); *F16H 63/3466* (2013.01); *B60K 2007/0061* (2013.01)
(58) Field of Classification Search
 CPC ... B60K 17/043; F16H 63/34; F16H 63/3425; F16H 63/3466; H02K 7/116; B60L 2200/44
 See application file for complete search history.

(56) References Cited

U.S. PATENT DOCUMENTS

| | | | | |
|---|---|---|---|---|
| 5,793,132 | A * | 8/1998 | Hirose | B60K 7/0007 310/71 |
| 8,776,936 | B2 * | 7/2014 | Mimura | B60K 7/0007 180/220 |
| 9,090,154 | B2 * | 7/2015 | Marro | B60K 7/0007 |
| 9,227,506 | B2 * | 1/2016 | Mair | B60K 7/0007 |
| 2016/0068054 | A1 | 3/2016 | Abe et al. | |

FOREIGN PATENT DOCUMENTS

| | | |
|---|---|---|
| JP | 2008-044438 | 2/2008 |
| JP | 2008-151308 | 7/2008 |
| JP | 2011-057011 | 3/2011 |
| JP | 2012-201289 | 10/2012 |
| JP | 2013-056573 | 3/2013 |
| JP | 2016-049000 | 4/2016 |

* cited by examiner

IN-WHEEL MOTOR DRIVE DEVICE

TECHNICAL FIELD

The present invention relates to an in-wheel motor drive device.

BACKGROUND ART

The in-wheel motor drive device includes a motor part, a speed reduction part that receives a driving force from the motor part, decelerates the rotational speed, and outputs it to the wheel side, and a wheel hub bearing part that is coupled to the output shaft of the speed reduction part. Conventional in-wheel motor drive devices include the one in Japanese Unexamined Patent Publication No. 2008-151308 (Patent Literature 1).

This Patent Literature 1 discloses a parking lock device for a vehicle having an in-wheel motor provided to each of a pair of right and left drive wheels. The parking lock device of Patent Literature 1 includes corresponding to each drive wheel: a parking gear fixed to a drive shaft joined to a rotation shaft of an in-wheel motor; an engagement piece supported swingably by a support shaft and having an engagement projection engaged with the parking gear at one end side thereof; and a contact member arranged so as to be movable in the range of the engagement piece in a state of being in contact with the engagement piece, and includes between the drive wheels: a single actuator to which each of the contact members is joined and which serves as a power source for each of the contact members.

CITATION LIST

Patent Literature

Patent Literature 1: Japanese Unexamined Patent Publication No. 2008-151308

SUMMARY OF INVENTION

Technical Problem

However, since the actuator of the parking lock device of Patent Literature 1 is provided outside the in-wheel motor, there is a problem that it becomes large.

In view of the above problem, the object of the present invention is to provide an in-wheel motor drive device that prevents an increase in size.

Solution to Problem

An in-wheel motor drive device of the present invention includes: a motor part that generates a driving force; a speed reduction part that decelerates and outputs the rotation of the motor part; a wheel hub bearing part that transmits an output from the speed reduction part to the drive wheel; and a housing that houses the speed reduction part therein, wherein: the speed reduction part is a parallel shaft gear reducer and includes a plurality of gear shafts extending in parallel to one another; one of the gear shafts is coupled with a rotation shaft of the motor part; the other one of the gear shafts is coupled with a wheel hub of the wheel hub bearing part; and the rest of the gear shafts decelerates the rotation of the motor part and transmits it to the wheel hub by a coupled gear. The in-wheel motor drive device further including: a parking gear that is attached to any one of the plurality of gear shafts; a parking pawl that has a projection portion to be engaged with a recess portion of the parking gear; and a movement member that enables the projection portion of the parking pawl to move between a locking position to be engaged with the recess portion of the parking gear and an unlocking position not to be engaged therewith, wherein: the parking gear, the parking pawl, and the movement member are housed inside the housing.

The in-wheel motor drive device of the present invention includes a parking lock mechanism that enables locking when the projection portion of the parking pawl is engaged with the recess portion of the parking gear, and enables unlocking unless the projection portion of the parking pawl is engaged with the recess portion of the parking gear. In addition to it, since the parking gear, the parking pawl, and the movement member are housed in the housing that houses the speed reduction part, it is possible to prevent the in-wheel motor drive device from becoming large in size even if the parking lock mechanism is included.

In the in-wheel motor drive device of the present invention, the plurality of gear shafts of the parallel shaft gear reducer are preferably constituted by a first shaft that is coupled with the rotation shaft of the motor part, a second shaft that decelerates the rotation of the motor part and transmits it to the wheel hub, and a third shaft that is coupled with the wheel hub of the wheel hub bearing part.

Due to this, by the gear shafts, it is possible to realize an in-wheel motor drive device that includes a three-gear-shaft parallel shaft gear reducer.

In the in-wheel motor drive device of the present invention, the movement member is preferably arranged so as to overlap with the axial position of a gear coupled with a shaft of the first to third shafts other than any one of the first to third shafts to which the parking gear is attached.

Thus, it is possible to further prevent the inside of the in-wheel motor drive device including the parking lock mechanism from becoming larger in size.

The in-wheel motor drive device of the present invention preferably further includes an oil tank provided below the gear shaft coupled with the rotation shaft of the motor part, wherein the parking gear, the parking pawl, and the movement member are arranged above the oil tank.

The present inventor has been paid attention to an empty space above the oil tank of the parallel shaft gear reducer, and conceived to arrange the parking gear, the parking pawl, and the movement member in this space. With this, it is possible to effectively prevent the inside of the in-wheel motor drive device including the parking lock mechanism from becoming larger in size.

In the in-wheel motor drive device of the present invention, the parking gear, the parking pawl, and the movement member are preferably arranged in a space at vehicle's outward side of the input gear of the first shaft and the outer diameter side of the small-diameter gear of the second shaft.

In this manner, it is possible to effectively prevent the inside of the in-wheel motor drive device including the parking lock mechanism from becoming larger in size.

Advantageous Effects of Invention

According to the in-wheel motor drive device of the present invention, it is possible to prevent an increase in size.

DESCRIPTION OF EMBODIMENT

Figure 1:
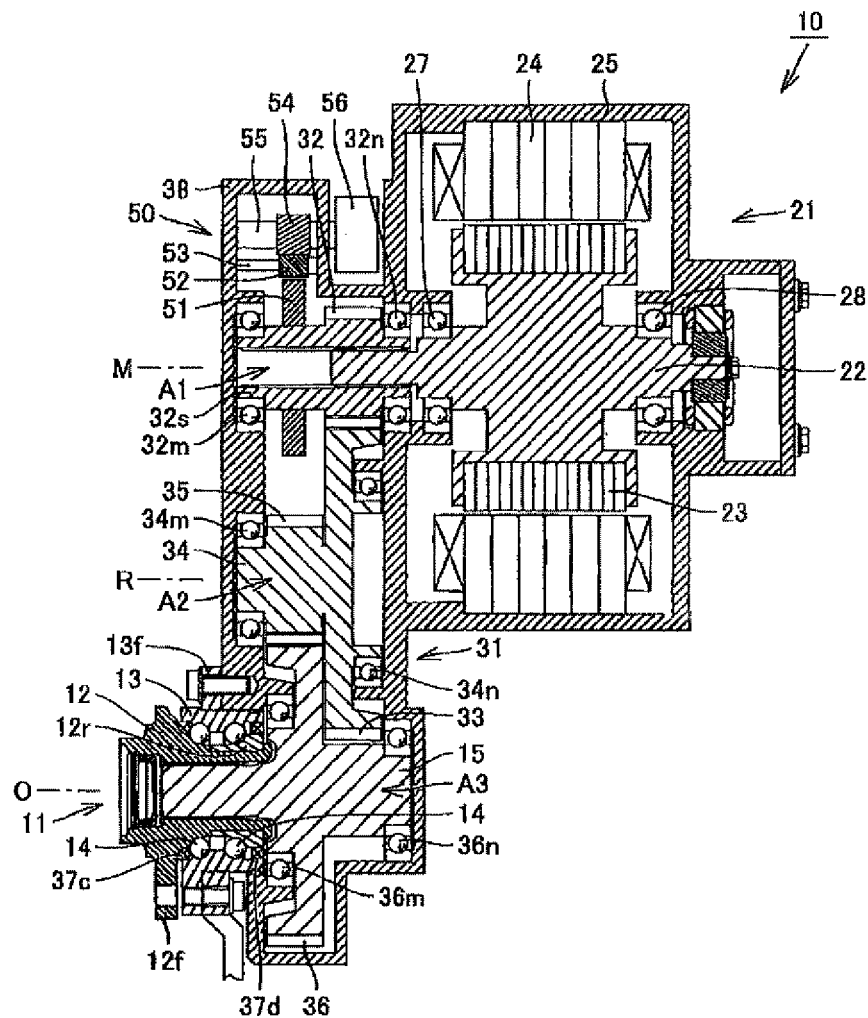
FIG. 1 is a longitudinal sectional view schematically showing an in-wheel motor drive device according to an embodiment of the present invention.

An embodiment of the present invention will be described below with reference to the drawings. In the following drawings, the identical or corresponding parts are given the identical reference numerals, and the description thereof will not be repeated. In FIG. 1, the left side of the drawing is the outward side in the vehicle width direction, and the right side of the drawing is the inward side in the vehicle width direction.

As shown in FIG. 1, an in-wheel motor drive device 10 includes a motor part 21 that generates a driving force, a speed reduction part 31 that decelerates and outputs the rotation of the motor part 21, and a wheel hub bearing part 11 that transmits to drive wheels an output from the speed reduction part 31. That is, the in-wheel motor drive device 10 includes the wheel hub bearing part 11 that is provided at the center of the wheel, the motor part 21 that drives the wheels, and the speed reduction part 31 that decelerates the rotation of the motor part and transmits it to the wheel hub bearing part 11. The motor part 21 and the speed reduction part 31 are arranged so as to be offset from an axis O of the wheel hub bearing part 11. The axis O extends in the vehicle width direction.

The wheel hub bearing part 11, with a rotational inner ring and a fixed outer ring, includes an inner ring 12 as a wheel hub coupled with an unillustrated road wheel, a non-rotating outer ring 13, and a plurality of rolling elements 14 arranged in an annular gap between the inner ring 12 and the outer ring 13, and thus constitutes an axle. The inner ring 12 is longer than the outer ring 13 and is passed through the center hole of the outer ring 13 so that both ends of the inner ring 12 protrude from the outer ring 13.

A coupling portion 12f is formed at one end of the axis O direction of the inner ring 12. The coupling portion 12f is a flange and constitutes a coupling portion for coaxially coupling with an unillustrated brake rotor and a wheel. The inner ring 12 is coupled with the wheel via the coupling portion 12f and rotates integrally with the wheel.

An inner bearing ring 12r is mounted and fixed to the outer circumference of the other end in the axis O direction of the inner ring 12. The rolling elements 14 are arranged in double rows separated in the axis O direction. The outer circumferential surface of the center portion in the axis O direction of the inner ring 12 constitutes an inner raceway surface of the rolling elements 14 of the first row and faces the inner circumferential surface of one side of the axis O direction of the outer ring 13. The outer circumferential surface of the inner bearing ring 12r constitutes an inner raceway surface of the rolling elements 14 of the second row and faces the inner circumferential surface of the other side of the axis O direction of the outer ring 13.

A coupling portion 13f is formed at one end in the axis O direction of the outer ring 13. The coupling portion 13f is a flange and is fixed to a main body casing 38 via a bolt.

The motor part 21 includes a motor rotation shaft 22, a rotor 23, a stator 24, and a motor casing 25, which are sequentially arranged from an axis M of the motor part 21 to the outer diameter side in this order. While the motor part 21 is a radial gap motor of an inner rotor and an outer stator type, it may be of another type. Though not illustrated, the motor part 21 may also be an axial gap, for or example.

The axis M that becomes a rotation center of the motor rotation shaft 22 and the rotor 23 extends in parallel to the axis O of the wheel hub bearing part 11. That is, the motor part 21 is arranged so as to be offset away from the axis O of the wheel hub bearing part 11. Both end portions of the motor rotation shaft 22 are rotatably supported by the motor casing 25 via rolling bearings 27 and 28. The motor casing 25 has a substantially cylindrical shape, and is coupled integrally with the main body casing 38 at one end in the axis M direction and sealed at the other end in the axis M direction. The motor part 21 drives the inner ring 12.

The speed reduction part 31 is a three-axis parallel shaft gear reducer, and includes an output gear 36 provided coaxially on the outer circumferential surface of the outer ring 13, an input gear 32 coupled coaxially to the motor rotation shaft 22 of the motor part 21, a first intermediate gear 33 and a second intermediate gear 35 that are a plurality of intermediate gears that transmit rotation from the input gear 32 to the output gear 36, and a main body casing 38 that houses these gears.

The input gear 32 is a small-diameter externally toothed gear, and a multitude of teeth formed on the outer circumference of one axial end portion of a shaft portion 32s arranged along the axis M. The outer circumference of the other axial end portion of the shaft portion 32s is fitted with one axial end portion of the motor rotation shaft 22 in a manner of being incapable of relative rotation. The shaft portion 32s is rotatably supported by the main body casing 38 on both end sides of the input gear 32 via rolling bearings 32m and 32n. The main body casing 38 of the present embodiment covers the speed reduction part 31 and the wheel hub bearing part 11 so as to surround the axes O, M, and R extending in parallel to one another and covers both axial sides of the speed reduction part 31. The shaft portion 32s constitutes the input shaft of the speed reduction part 31. One axial end face of the main body casing 38 faces the brake rotor. The other axial end face of the main body casing 38 is coupled with the motor casing 25. The motor casing 25 is attached to the main body casing 38 and protrudes from the main body casing 38 to the other axial side. The main body casing 38 houses all of the rotating elements (shafts and gears) of the speed reduction part 31. That is, the main body casing 38 houses the speed reduction part 31 therein.

Figure 2:
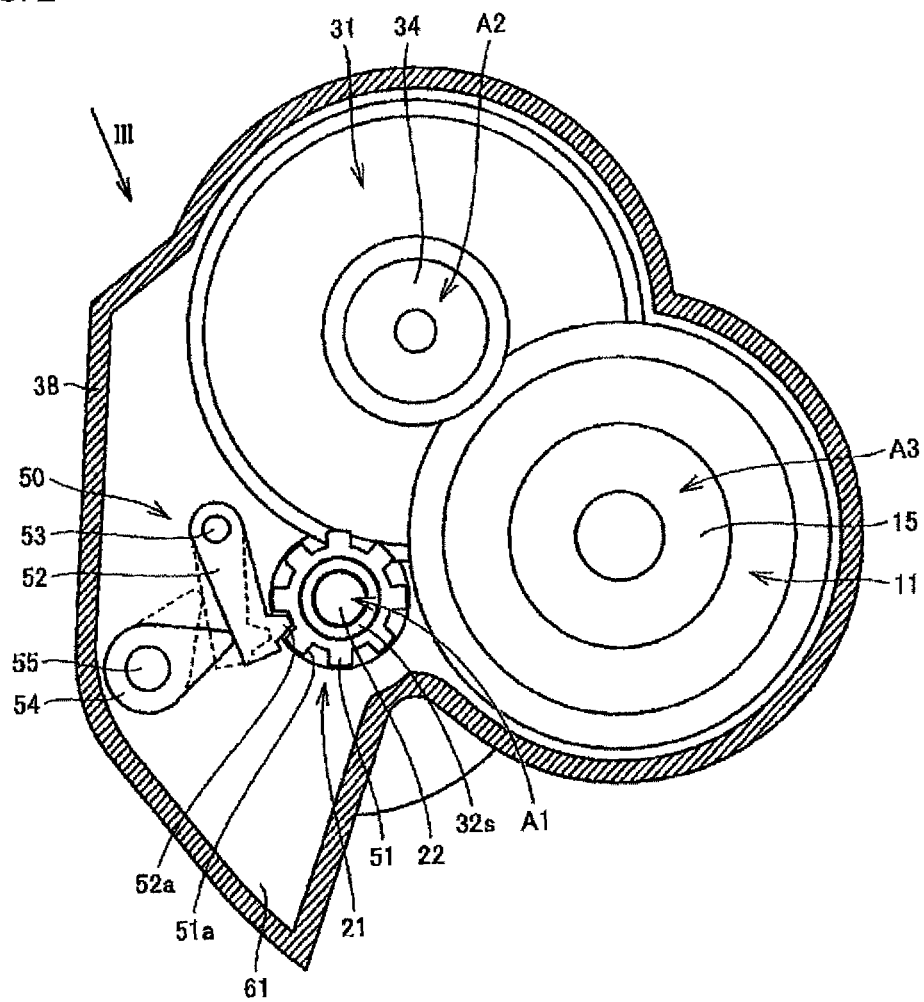
FIG. 2 is a front view schematically showing a vicinity of the parking lock mechanism constituting the in-wheel motor drive device according to the embodiment of the present invention.

The small-diameter input gear 32 engages with the first intermediate gear 33, which is a large-diameter externally toothed gear. The first intermediate gear 33 is coupled coaxially with the second intermediate gear 35, which is a small-diameter externally toothed gear, via an intermediate shaft 34. Both end portions of the intermediate shaft 34 are rotatably supported by the main body casing 38 via rolling bearings 34m and 34n. The first intermediate gear 33 and the second intermediate gear 35 are arranged between the rolling bearing 34m and the rolling bearing 34n and are adjacent to each other. In the present embodiment, the first intermediate gear 33 and the intermediate shaft 34 are integrally formed, and the second intermediate gear 35 is fitted to the outer circumference of the intermediate shaft 34 in a manner of being incapable of relative rotation. The axis R passing through the center of the intermediate shaft 34 extends in parallel with the axis O of the wheel hub bearing part 11. As a result, the speed reduction part 31 is arranged offset from the wheel hub bearing part 11. The small-diameter second intermediate gear 35 is engaged with the large-diameter output gear 36. The positional relationship among the axes O, R, and M is as shown in FIG. 2. The speed reduction part 31 is a parallel triaxial gear reducer having the axes O, R, and M extending in parallel to one another.

The output gear 36 is an externally toothed gear provided coaxially with the output shaft 15 and is a helical gear. The output shaft 15 is rotatably supported by the front surface portion of the main body casing 38 via the rolling bearing 36$m$ on one side in the axis O direction from the output gear 36. Further, the output shaft 15 is rotatably supported by the back surface portion of the main body casing 38 via the rolling bearing 36$n$ on the other side in the axis O direction from the output gear 36.

Openings for allowing the inner ring 12 to penetrate are formed on each axial end of the main body casing 38. Each of the openings is provided with sealing materials 37$c$ and 37$d$ that seal the annular gap with the inner ring 12. Therefore, the inner ring 12 to be a rotating body is covered by the main body casing 38 except for one end in the axis O direction. In other words, the wheel hub bearing part 11 is housed in the main body casing 38 except for the both end portions. The main body casing 38 is placed across the three axes O, R, and M that are parallel to one another.

As shown in FIG. 1, the first intermediate gear 33, the second intermediate gear 35, and the intermediate shaft 34 are arranged on the outer diameter side of the outer ring 13. Further, the first intermediate gear 33, the second intermediate gear 35, and the intermediate shaft 34 are arranged so as to overlap with the position in the axis O direction of the outer ring 13. The same is true for the input gear 32 and the output gear 36. In the present embodiment, the entire first intermediate gear 33 and the entire second intermediate gear 35 are arranged on the outer diameter side of the outer ring 13. It is to be noted that the intermediate shaft 34 may be elongated to separate the large-diameter first intermediate gear 33 from the small-diameter second intermediate gear 35, so that the outer circumference of the first intermediate gear 33 is arranged so as to overlap with the outer ring 13 as viewed in the axis O direction.

The speed reduction part 31 of the present embodiment includes a three-axis gear shaft composed of a first shaft A1, a second shaft A2, and a third shaft A3, extending in parallel to one another. The first to third shafts A1 to A3 are transmission elements. The first shaft A1 is coupled with the motor rotation shaft 22, which is a rotation shaft of the motor part 21, and is an input shaft of the speed reduction part 31. The second shaft A2 decelerates the rotation of the first shaft A1 and transmits it to the third shaft A3, and is an intermediate shaft of the speed reduction part 31. In FIG. 1, the intermediate shaft is the second shaft (one), but the intermediate shaft of the present invention may be plural. The third shaft A3 is coupled with the inner ring 12, which is the wheel hub of the wheel hub bearing part 11, and is the output shaft of the speed reduction part 31.

Figure 3:
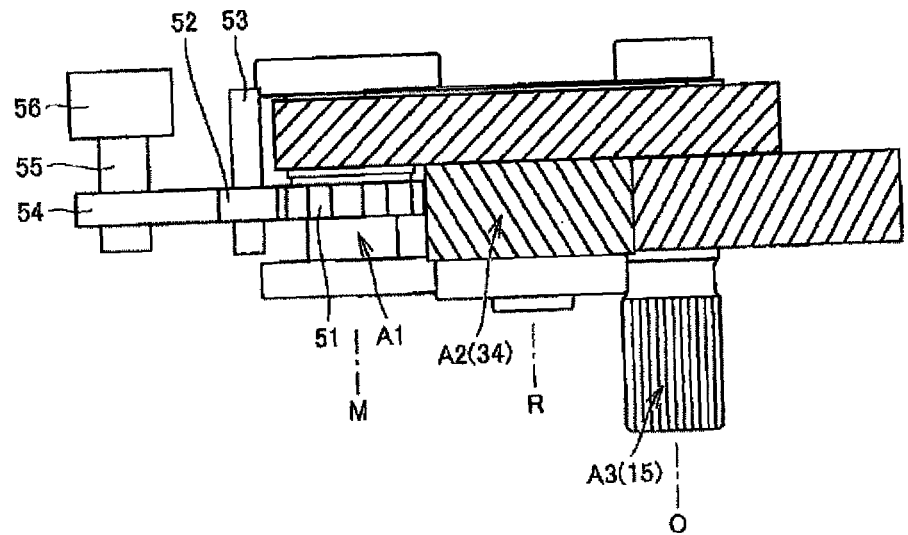
FIG. 3 is a plan view schematically showing the vicinity of the parking lock mechanism constituting the in-wheel motor drive device according to the embodiment of the present invention, as seen from the arrow III in FIG. 2.

As shown in FIG. 1 and FIG. 2, the in-wheel motor drive device 10 of the present embodiment includes a parking lock mechanism 50. The parking lock mechanism 50 mainly includes a parking gear 51, a parking pawl 52, and a parking cam 54 as a movement member. Hereinafter, the parking lock mechanism 50 will be described with reference to FIG. 1 to FIG. 3.

The parking gear 51 is attached to the first shaft A1. In FIG. 1, the parking gear 51 is provided being fitted on the outer circumference of the shaft portion 32$s$. Such a fitting is, for example, a spline fitting. The parking gear 51 includes a recess portion 51$a$ having a bottom land of the gear.

The parking pawl 52 is provided so as to engage with the parking gear 51. Specifically, the parking pawl 52 has a projection portion 52$a$ that is engaged with the recess portion 51$a$ of the parking gear 51. When the projection portion 52$a$ of the parking pawl 52 is engaged with the recess portion 51$a$ of the parking gear 51, the rotation of the parking gear 51 is locked and the first shaft A1 is not capable of rotating. When the projection portion 52$a$ of the parking pawl 52 is not engaged with the recess portion 51$a$ of the parking gear 51, the rotation of the parking gear 51 is unlocked and the first shaft A1 becomes capable of rotating.

In order to support the parking pawl 52, a support member 53 is provided. The support member 53 is a shaft joined to the main body casing 38.

The parking cam 54 is provided on the opposite side of the parking gear 51 in the parking pawl 52. The parking cam 54 enables the projection portion 52$a$ of the parking pawl 52 to move between a locking position engaged with the recess portion 51$a$ of the parking gear 51 and an unlocking position (position of the parking pawl 52 indicated by the dotted line in FIG. 2) not engaged therewith. For example, when the parking pawl 52 is moved from the unlocking position to the locking position, the back surface of the parking pawl 52 is pressed in order to displace the tip portion of the parking cam 54 from the position indicated by the dotted line to the position indicated by the solid line in FIG. 2.

The parking cam 54 is arranged so as to overlap with the axial position of the gears (the first intermediate gear 33, the second intermediate gear 35, and the output gear 36 in FIG. 1) coupled with the second shaft A2 and the third shaft A3 other than the first shaft A1 to which the parking gear is attached. That is, the parking cam 54 is arranged so as to overlap with the axial position of the gear coupled to the gear shaft to which the parking gear 51 is not attached. In FIG. 1, the parking cam 54, the parking pawl 52, and the parking gear 51 are arranged so as to overlap with the axial position of the gear coupled to the second shaft A2 and the third shaft A3.

In order to selectively move the parking cam 54 in this manner, a step motor 56 is provided. By the step motor 56, the tip of the parking pawl 52 is displaced to the dotted line position and the solid line position in FIG. 2. The step motor 56 is provided outside the main body casing 38, and is arranged between the main body casing 38 and the motor casing 25.

A joining member 55 for joining the step motor 56 with the parking cam 54 is provided. The joining member 55 is a shaft, and a part thereof is located outside the main body casing 38 and the other part thereof is located inside the main body casing 38.

As described above, in the parking lock mechanism 50 of the present embodiment, parts of the parking gear 51, the parking pawl 52, the support member 53, the parking cam 54, and the joining member 55 are housed inside the main body casing 38. That is, the parking lock mechanism 50 of the present embodiment is a built-in type, and at least one member constituting the parking lock mechanism 50 is arranged so as to be integrated with the main body casing 38.

As shown in FIG. 2, the parking gear 51, the parking pawl 52, and the parking cam 54 are arranged in a space above an oil tank 61 provided below the first shaft A1. In other words, the parking gear 51, the parking pawl 52, and the parking cam 54 are arranged in the space of the oil tank 61.

Further, the parking gear 51, the parking pawl 52, and the parking cam 54 are arranged in a space at vehicle's outward side of the input gear of the first shaft A1 and the outer diameter side of the small-diameter gear of the second shaft A2.

Figure 4:
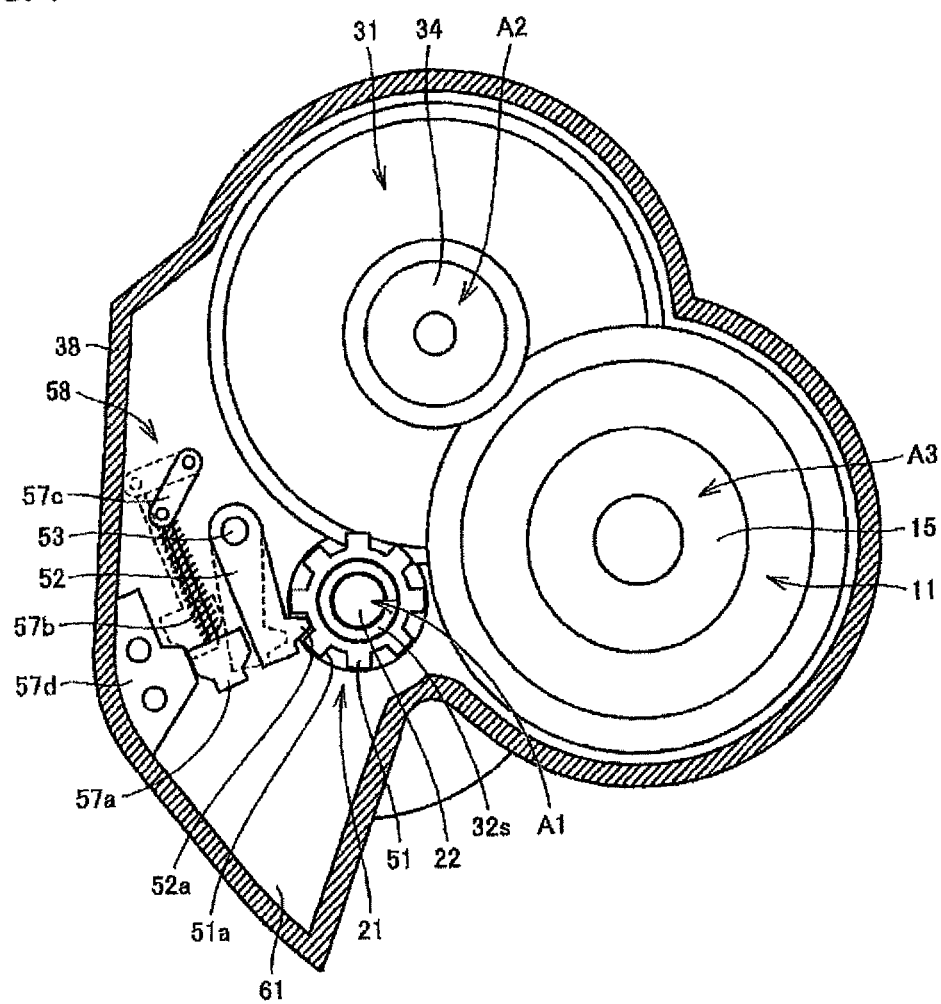
FIG. 4 is a plan view schematically showing the vicinity of the parking lock mechanism of a variation constituting the in-wheel motor drive device according to the embodiment of the present invention.

Next, a parking lock mechanism 58 of a variation will be described with reference to FIG. 4. As shown in FIG. 4, the parking lock mechanism 58 of the variation includes basically the same configuration as that of the parking lock mechanism 50 shown in FIG. 2. However, it is different mainly in a use of a parking rod 57a in place of the parking cam 54 as a movement member.

Specifically, the parking cam 54 is omitted, and instead, the parking rod 57a, a spring member 57b, a swing member 57c, and a support member 57d are included. The parking rod 57a enables the projection portion 52a of the parking pawl 52 to move between a locking position engaged with the recess portion 51a of the parking gear 51 and an unlocking position (position of the parking pawl 52 indicated by the dotted line in FIG. 2) not engaged therewith. The parking rod 57a is movable in the front-rear direction, and has a front surface, a back surface, one side surface, and the other side surface. One side surface of the parking rod 57a presses the parking pawl 52. On one side and the other side surfaces, a step portion is formed.

The spring member 57b is joined to the back surface of the parking rod 57a in order to realize a waiting mechanism. The swing member 57c is joined to the other end of the spring member 57b. One end of the swing member 57c is fixed, and the other end joined to the spring member 57b is configured to be displaceable about one end.

On the side of the other side surface of the parking rod 57a, the support member 57d is provided. The support member 57d is attached to the main body casing 38 and fixed thereto. In the support member 57d, a step portion for locking the step portion formed on the other side surface of the parking rod 57a is formed.

In the unlocking position, the projection portion 52a of the parking pawl 52 is not engaged with the recess portion 51a of the parking gear 51. In this state, as shown by the dotted line in FIG. 4, the step portion of the parking rod 57a is locked to the step portion of the support member 57d and is not capable of moving, and the spring member 57b is compressed and put in a waiting state. When the parking pawl 52 is moved from the unlocking position to the locking position, the other end of the swing member 57c is displaced to unlock the engagement between the parking rod 57a and the support member 57d, and as shown by the solid line in FIG. 4, the parking rod 57a is biased by the spring member 57b, thereby pressing one side surface of the parking rod 57a against the parking pawl 52. This allows the parking pawl 52 to move from the unlocking position to the locking position.

As described above, in the in-wheel motor drive device 10 of the present embodiment, the speed reduction part 31 is a parallel shaft gear reducer and includes the first to third shafts A1 to A3 extending in parallel to one another, and the first shaft A1 is coupled with the motor rotation shaft 22 of the motor part 21, the in-wheel motor drive device 10 further includes the parking gear 51 attached to the first shaft A1, the parking pawl 52 having the projection portion 52a engaged with the recess portion 51a of the parking gear 51, and the parking cam 54 or the parking rod 57a that enables the projection portion of the parking pawl 52 to move between the locking position engaged with the recess portion 51a of the parking gear 51 and the unlocking position not engaged therewith, wherein the parking gear 51, the parking pawl 52, and the parking cam 54 or the parking rod 57a are housed inside the housing (the main body casing 38) that houses the speed reduction part 31. The in-wheel motor drive device 10 according to the present embodiment further includes the oil tank 61 provided below the first shaft A1, wherein the parking gear 51, the parking pawl 52, and the parking cam 54 or the parking rod 57a are arranged above the oil tank 61.

Since a space is available above the oil tank 61 of the parallel shaft gear reducer, the parking lock mechanism 50 or 58 is arranged using this empty space. That is, the parking gear 51, the parking pawl 52, and the parking cam 54 or the parking rod 57a are arranged by effectively utilizing the empty space in the main body casing 38 that houses the speed reduction part 31. Therefore, it is possible to provide the parking lock mechanism without enlarging the outer shell of the in-wheel motor drive device 10. Thus, according to the in-wheel motor drive device 10 of the present embodiment, it is possible to prevent an increase in size.

As described above, the in-wheel motor drive device 10 of the present embodiment is capable of housing the parking gear 51, the parking pawl 52, and the parking cam 54 or the parking rod 57a in the main body casing 38, and hence maintenance and assembly are easy.

In the example presented in the description of the present embodiment, the parking gear 51 is attached to the first shaft A1 coupled with the rotation shaft of the motor part. However, the parking gear 51 of the present invention may be attached to the second shaft A2 or the third shaft A3. In addition, the parking gear 51 may be attached to the motor rotation shaft 22 of the motor part 21.

In the example presented in the description of the present embodiment, the plurality of gear shafts of the parallel shaft gear reducer are constituted by the first to third shafts A1 to A3. In the plurality of gear shafts of the present invention, however, there may be a plurality of gear shafts that decelerate the rotation of the motor part and transmit it to the wheel hub by the coupled gears.

The means for moving the movement member is not particularly limited to the step motor 56, and, for example, a wire, a solenoid, or the like may be used.

In the present embodiment, the recess portion 51a of the parking gear 51 includes the bottom. However, the recess portion of the parking gear 51 may be formed on the tooth surface.

It should be considered that the embodiment disclosed here is an example in all respects and it is not restrictive. The scope of the present invention is not limited to the above-mentioned embodiment but is defined by the claims, and it is intended to include all modifications within the meaning and scope equivalent to the claims.

INDUSTRIAL APPLICABILITY

The in-wheel motor drive device of the present invention is advantageously used in electric vehicles, hybrid vehicles, and the like.

REFERENCE SIGNS LIST 10 in-wheel motor drive device
11 wheel hub bearing part
12 inner ring
12f, 13f coupling portion
12r inner bearing ring
13 outer ring
14 rolling element 15 output shaft
21 motor part
22 motor rotation axis
23 rotor
24 stator
25 motor casing
27, 28, 32m, 32n, 34m, 34n, 34m, 34n, 36m, 36n bearing
31 speed reduction part
32 input gear
32s shaft portion
33 first intermediate gear
34 intermediate shaft
35 second intermediate gear
36 output gear
37c, 37d sealing material
38 main body casing
50, 58 parking lock mechanism
51 parking gear
51a recess portion
52 parking pawl
52a projection portion
53 support member
54 parking cam
55 joining member
56 step motor
57a parking rod
57b spring member
57c swing member
57d support member
61 oil tank
A1 first shaft
A2 second shaft
A3 third shaft
M, O, R axis

The invention claimed is:

1. An in-wheel motor drive device, comprising:
a motor portion that generates a driving force;
a speed reduction part that decelerates and outputs rotation of the motor part;
a wheel hub bearing part that transmits an output from the speed reduction part to a drive wheel; and
a housing that houses the speed reduction part therein, wherein:
the speed reduction part is a parallel shaft gear reducer and includes a plurality of gear shafts extending in parallel to one another;
the plurality of gear shafts include a first shaft that is coupled with a rotation shaft of the motor part, a second shaft that decelerates rotation of the motor part and transmits it to the wheel hub, and a third shaft that is coupled with the wheel hub of the wheel hub bearing part,
the in-wheel motor drive device further comprising:
a parking gear that is attached to any one of the first, second, or third shafts;
a parking pawl that has a projection portion to be engaged with a recess portion of the parking gear;
a movement member that enables the projection portion of the parking pawl to move between a locking position to be engaged with the recess portion of the parking gear and an unlocking position not to be engaged therewith;
a step motor provided to selectively move the movement member; and
a joining member for joining the step motor with the movement member,
wherein:
the parking gear, the parking pawl, and the movement member are housed inside the housing;
the step motor is arranged between the housing and a motor casing, and
the joining member is a shaft, and a part thereof is located outside the housing and another part of the shaft thereof is located inside housing.

2. The in-wheel motor drive device according to claim 1, wherein the parking gear is attached to the first shaft, and the movement member is arranged so as to overlap with an axial position of a gear coupled with the second and third shafts.

3. The in-wheel motor drive device according to claim 1, further comprising an oil tank provided below the first shaft, wherein
the parking gear, the parking pawl, and the movement member are arranged above the oil tank.

4. The in-wheel motor drive device according to claim 1, wherein the parking gear, the parking pawl, and the movement member are arranged in a space axially offset from an input gear of the first shaft and radially offset of an outer diameter side of a small-diameter gear of the second shaft.

* * * * *